(12) United States Patent
Caponetti et al.

(10) Patent No.: US 11,692,527 B2
(45) Date of Patent: Jul. 4, 2023

(54) WIND TURBINE CONTROL USING CONSTRAINT SCHEDULING

(71) Applicant: VESTAS WIND SYSTEMS A/S, Aarhus N (DK)

(72) Inventors: Fabio Caponetti, Åbyhøj (DK); Tobias Gybel Hovgaard, Ry (DK); Christian Jeppesen, Aarhus C (DK); Silvia Estelles Martinez, Vila do Conde (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 126 days.

(21) Appl. No.: 17/142,139

(22) Filed: Jan. 5, 2021

(65) Prior Publication Data

US 2021/0207585 A1      Jul. 8, 2021

(30) Foreign Application Priority Data

Jan. 6, 2020   (DK) .......................... PA 2020 70005

(51) Int. Cl.
*F03D 7/04*      (2006.01)
*F03D 7/02*      (2006.01)

(52) U.S. Cl.
CPC .......... *F03D 7/045* (2013.01); *F03D 7/0224* (2013.01); *F05B 2260/8211* (2013.01);
(Continued)

(58) Field of Classification Search
CPC .................. F03D 7/0224; F03D 7/045; F05B 2260/8211; F05B 2260/84; F05B 2270/20; F05B 2270/404
(Continued)

(56) References Cited

U.S. PATENT DOCUMENTS 9,859,828 B2 *   1/2018   Tarnowski ................ H02J 3/28
2010/0100248 A1 *   4/2010   Minto .................. G05B 13/027
                                                                700/287
(Continued)

FOREIGN PATENT DOCUMENTS

EP           2516849 A2    10/2012
EP           2799711 A1    11/2014
(Continued)

OTHER PUBLICATIONS

Arne Koerber et al: "Combined Feedback Feedforward Control of Wind Turbines Using State-Constrained Model Predictive Control", IEEE Transactions on Control Systems Technology, IEEE Service Center, New York, NY, US, vol. 21, No. 4, Jul. 1, 2013 (Jul. 1, 2013), pp. 1117-1128, XP011515138, ISSN: 1063-6536, DOI: 10.1109/TCST.2013.2260749.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

The invention provides a method for controlling a wind turbine, including predicting behaviour of one or more wind turbine components such as a wind turbine tower over a prediction horizon using a wind turbine model that describes dynamics of the one or more wind turbine components or states. The method includes determining behavioural constraints associated with operation of the wind turbine, wherein the behavioural constraints are based on operational parameters of the wind turbine such as operating conditions, e.g. wind speed. The method includes using the predicted behaviour of the one or more wind turbine components in a cost function, and optimising the cost function subject to the determined behavioural constraints to determine at least one (Continued)

control output, such as blade pitch control or generator speed control, for controlling operation of the wind turbine.

20 Claims, 8 Drawing Sheets

(52) U.S. Cl.
CPC ....... *F05B 2260/84* (2013.01); *F05B 2270/20* (2013.01); *F05B 2270/404* (2013.01)

(58) Field of Classification Search
USPC .......................................................... 700/287
See application file for complete search history.

(56) References Cited

U.S. PATENT DOCUMENTS

| | | | | |
|---|---|---|---|---|
| 2012/0049516 | A1* | 3/2012 | Viassolo | F03D 9/10 290/44 |
| 2013/0106107 | A1* | 5/2013 | Spruce | F03D 7/0224 290/44 |
| 2015/0377213 | A1* | 12/2015 | Deshpande | F03D 9/25 290/44 |
| 2016/0053745 | A1* | 2/2016 | Blom | F03D 7/0264 416/1 |
| 2016/0215759 | A1* | 7/2016 | Fleming | F03D 7/046 |
| 2017/0226989 | A1* | 8/2017 | Hammerum | F03D 7/045 |
| 2017/0248124 | A1* | 8/2017 | Hammerum | F03D 7/045 |
| 2019/0154000 | A1 | 5/2019 | Hammerum et al. | |
| 2019/0203695 | A1 | 7/2019 | Hammerum et al. | |

FOREIGN PATENT DOCUMENTS

| | | |
|---|---|---|
| EP | 3180514 A1 | 6/2017 |
| EP | 3180515 A1 | 6/2017 |
| EP | 3263890 A1 | 1/2018 |

OTHER PUBLICATIONS

Lasheen Ahmed et al: "Explicit model predictive control with time varying constraints for collective pitching in large wind turbines", IECON 2016—42nd Annual Conference of the IEEE Industrial Electronics Society, IEEE, Oct. 23, 2016 (Oct. 23, 2016), pp. 4121-4126, XP033033754, DOI: 10.1109/IECON.2016.7793552.
European Patent Office Extended European Search Report for Application No. 21150326.3-1007 dated Jun. 1, 2021.
Danish Patent and Trademark Office 1st Technical Examination for Patent Application PA 2020 70005 dated Jan. 6, 2020.

* cited by examiner

WIND TURBINE CONTROL USING CONSTRAINT SCHEDULING

FIELD OF THE INVENTION

The present invention generally relates to controlling operation of a wind turbine using constraint scheduling, particularly by scheduling constraints based on operational parameters of the wind turbine in the determination of control outputs.

BACKGROUND

Wind turbine control technology is used for optimisation of power and minimisation of loads. Many different loads act on a wind turbine, such as aerodynamic, gravity, centrifugal and inertial loads. Changes in the loads experienced by a wind turbine may be caused by wind conditions in the vicinity of the wind turbine, e.g. wind shear or turbulence, or may be caused by changing operation of the wind turbine, e.g. grid loss.

Predictive control methods are known to be used in association with wind turbine control technology, in particular to increase or maximise power output of a wind turbine and/or reduce or minimise loading on a wind turbine. Model predictive control (MPC) is one approach for providing wind turbine control. A predictive controller is provided with a wind turbine model function operating on a number of input variables, and control outputs are derived accordingly, in this case by optimisation.

The optimisation problem to be solved in the above methods takes the form of optimising a cost function bounded by, or subject to, a number of constraints. Such constraints can take the form of hard constraints—which must be satisfied in the solution—or soft constraints—which may not be satisfied in the solution, but which penalise variable values in the wind turbine model function based on the extent to which the constraint is not satisfied.

Constraints may be placed on one or more of the control outputs of the optimisation, for instance a maximum torque or speed permitted in the generator of the wind turbine. Constraints may also be placed on the behaviour of components of the wind turbine, for instance an amount of deflection of a tower of the wind turbine from a neutral or upright position, or a maximum loading in a flapwise direction on one or more of the wind turbine blades. However, such constraints in the optimisation problem do not necessarily result in optimal behaviour of the wind turbine in rapidly changing operating conditions, e.g. when the wind turbine is exposed to a gust of wind, when there is a rapid change in wind direction, etc.

It is against this background to which the present invention is set.

SUMMARY OF THE INVENTION

According to an aspect of the present invention there is provided a method for controlling a wind turbine. The method comprises predicting behaviour of one or more wind turbine components over a prediction horizon using a wind turbine model that describes dynamics of the one or more wind turbine components or states. The method comprises determining at least one behavioural constraint associated with operation of the wind turbine, wherein the at least one behavioural constraint is determined in dependence on at least one operational parameter of the wind turbine. The method comprises using the predicted behaviour of the one or more wind turbine components in a cost function, and optimising the cost function subject to the at least one determined behavioural constraint to determine at least one control output for controlling operation of the wind turbine.

Predicting behaviour of the one or more wind turbine components may comprise predicting the at least one operational parameter over the prediction horizon.

The at least one behavioural constraint may be determined in dependence on the at least one predicted operational parameter of the wind turbine.

The at least one operational parameter may comprise a wind condition in the vicinity of the wind turbine, optionally wind speed in the vicinity of the wind turbine.

The at least one operational parameter may comprise a control setting of the wind turbine, optionally a collective or individual pitch position setting of blades of the wind turbine, optionally a power reference of the wind turbine.

The at least one behavioural constraint may be determined based on expected dynamics of the one or more wind turbine components. The expected dynamics may be determined using a further wind turbine model.

The expected dynamics of each of the one or more wind turbine components may comprise values of a metric describing the dynamics for different operational parameters of the wind turbine. The at least one behavioural constraint may be determined in dependence on the values of the metric.

The at least one behavioural constraint may be a threshold value determined by applying a scaling factor to the values of the metric, in particular values of the metric in nominal operation/behaviour or under expected normal operation. The at least one behavioural constraint may be a threshold value determined by adding or subtracting an operational margin to the values of the metric. The metric values may include at least one of maximum, minimum and mean values.

The method may comprise determining the at least one behavioural constraint at each time step of the method.

The method may comprise applying a low-pass filter, moving average, or other suitable smoothing function, to the operational parameter prior to determining the at least one behavioural constraint.

The at least one behavioural constraint associated with operation of the wind turbine may comprise at least one behavioural constraint for one or more of the wind turbine components.

The one or more wind turbine components may comprise a tower of the wind turbine, and the behavioural constraint for the tower may be a maximum deflection of the tower. The one or more wind turbine components may comprise a generator of the wind turbine, and the behavioural constraint for the generator may be a maximum speed of the generator.

The at least one behavioural constraint associated with operation of the wind turbine may comprise at least one behavioural constraint of operational performance of the wind turbine, optionally a noise level generated by the wind turbine, further optionally a power production level of the wind turbine.

According to another aspect of the present invention there is provided a non-transitory, computer-readable storage medium storing instructions thereon that when executed by a processor causes the processor to perform the method described above.

According to another aspect of the present invention there is provided a controller for controlling a wind turbine. The controller is configured to predict behaviour of one or more wind turbine components over a prediction horizon using a wind turbine model that describes dynamics of the one or more wind turbine components. The controller is configured to determine a behavioural constraint associated with operation of the wind turbine, wherein the at least one behavioural constraint is determined in dependence on at least one operational parameter of the wind turbine. The controller is configured to use the predicted behaviour of the one or more wind turbine components in a cost function, and optimise the cost function subject to the at least one determined behavioural constraint to determine at least one control output for controlling operation of the wind turbine.

According to another aspect of the present invention there is provided a wind turbine comprising a controller as described above.

BRIEF DESCRIPTION OF THE DRAWINGS

One or more embodiments of the invention will now be described by way of example with reference to the accompanying drawings, in which.

DETAILED DESCRIPTION

Figure 1:
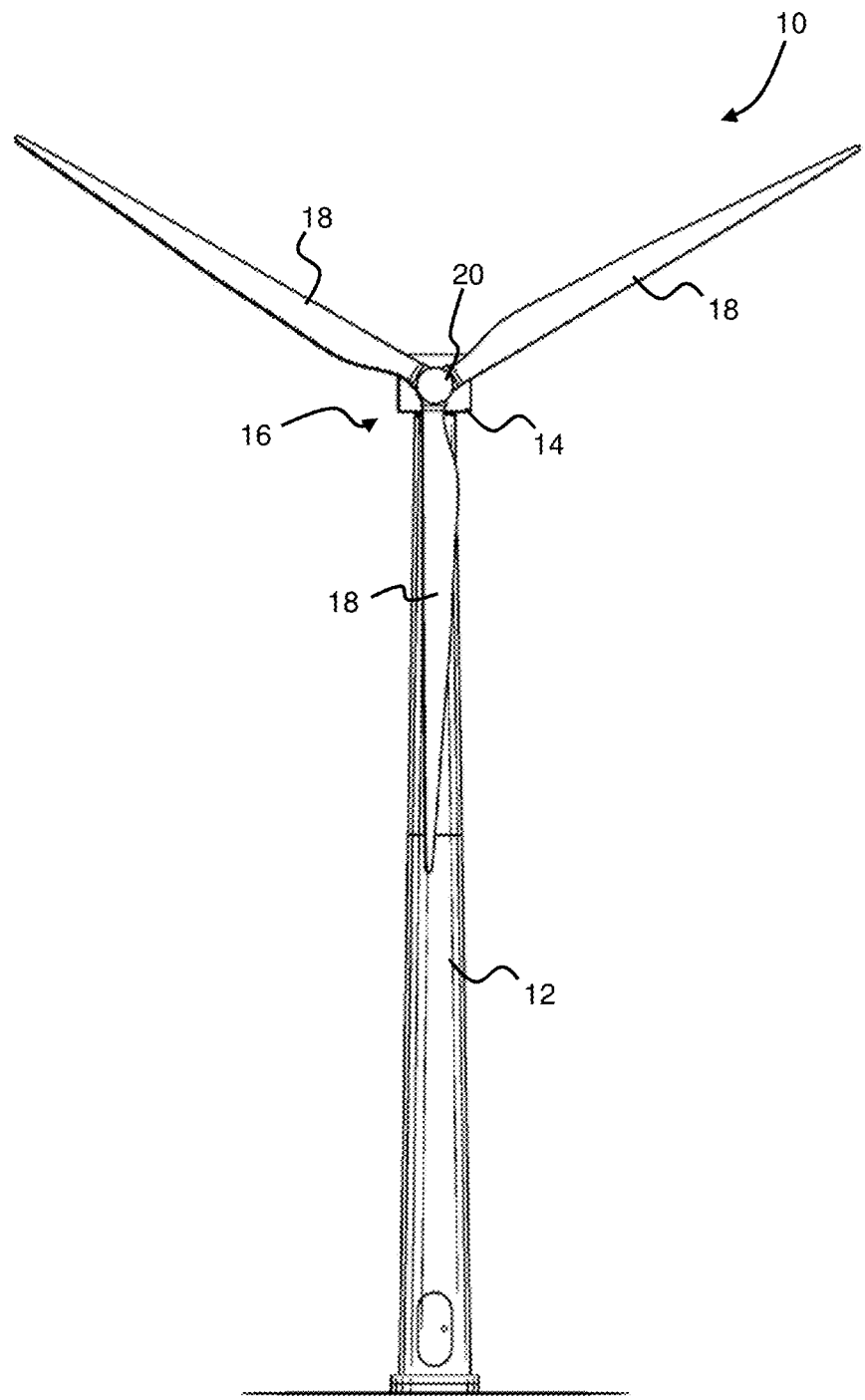
FIG. 1 is a schematic diagram of a wind turbine according to an example of the invention.

FIG. 1 shows a wind turbine 10 in which an example of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 and a single rotor 16, although other configurations including any suitable number of blades and rotors are possible.

Figure 2:
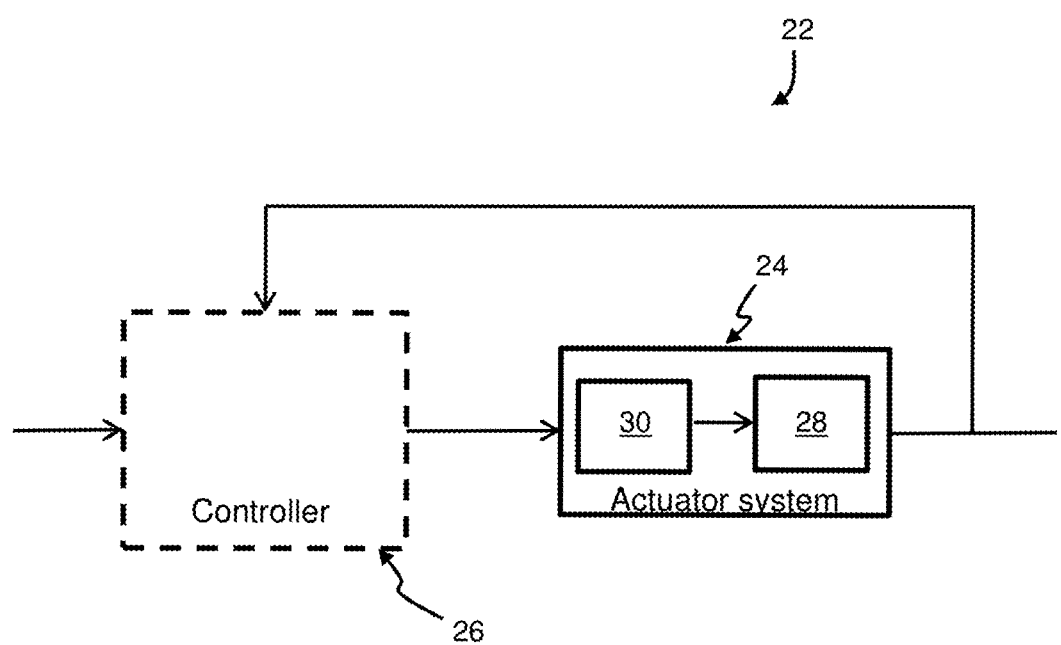
FIG. 2 shows a controller of the wind turbine of FIG. 1, and an actuator system of the wind turbine to be controlled by the controller.

FIG. 2 shows a wind turbine control system 22 in accordance with an example of the invention which may be implemented in the wind turbine 10 of FIG. 1. Here, the control system 22 includes an actuator system 24 that is controlled by a control unit or controller 26. The controller 26 may be for controlling any suitable system or component of the wind turbine 10. For instance, the actuator system 24 may be, or may comprise, a pitch system for controlling pitch of all, or just one, of the wind turbine blades 18 which may include a hydraulic actuator 28 arranged to adjust blade pitch in a known manner. The actual position of the actuator 28 is controllable by an actuator position control unit 30 which provides a positioning command signal to the hydraulic actuator or pitch system 28. Alternatively, the actuator system 24 may be an electric or hydraulic yaw drive for the nacelle 14 of the wind turbine 10 to provide rotational position control of the nacelle 14 with respect to the tower 12. Another example would be a converter control system where the actuator system 24 may be a power converter of the generation system of the wind turbine 10 that converts AC power delivered by the generator to a variable-frequency AC power output via a DC link in a process known as 'full power conversion', or an induction motor working in synchrony with the grid. The skilled person will appreciate that the principle of the invention described herein could be applied to any suitable wind turbine system or component that requires high speed real time control.

In examples of the invention, a wind turbine model describing dynamics of the one or more systems or components to be controlled is defined. A number of input variables are estimated and/or measured, and the controller 26 uses the wind turbine model to predict the behaviour of the one or more systems or components over a prediction horizon. A cost function is then optimised subject to one or more constraints associated with operation of the wind turbine 10 to determine one or more control outputs over the prediction horizon, the control outputs being used to control operation of the wind turbine 10, e.g. to control the actuator system 24.

Figure 3:
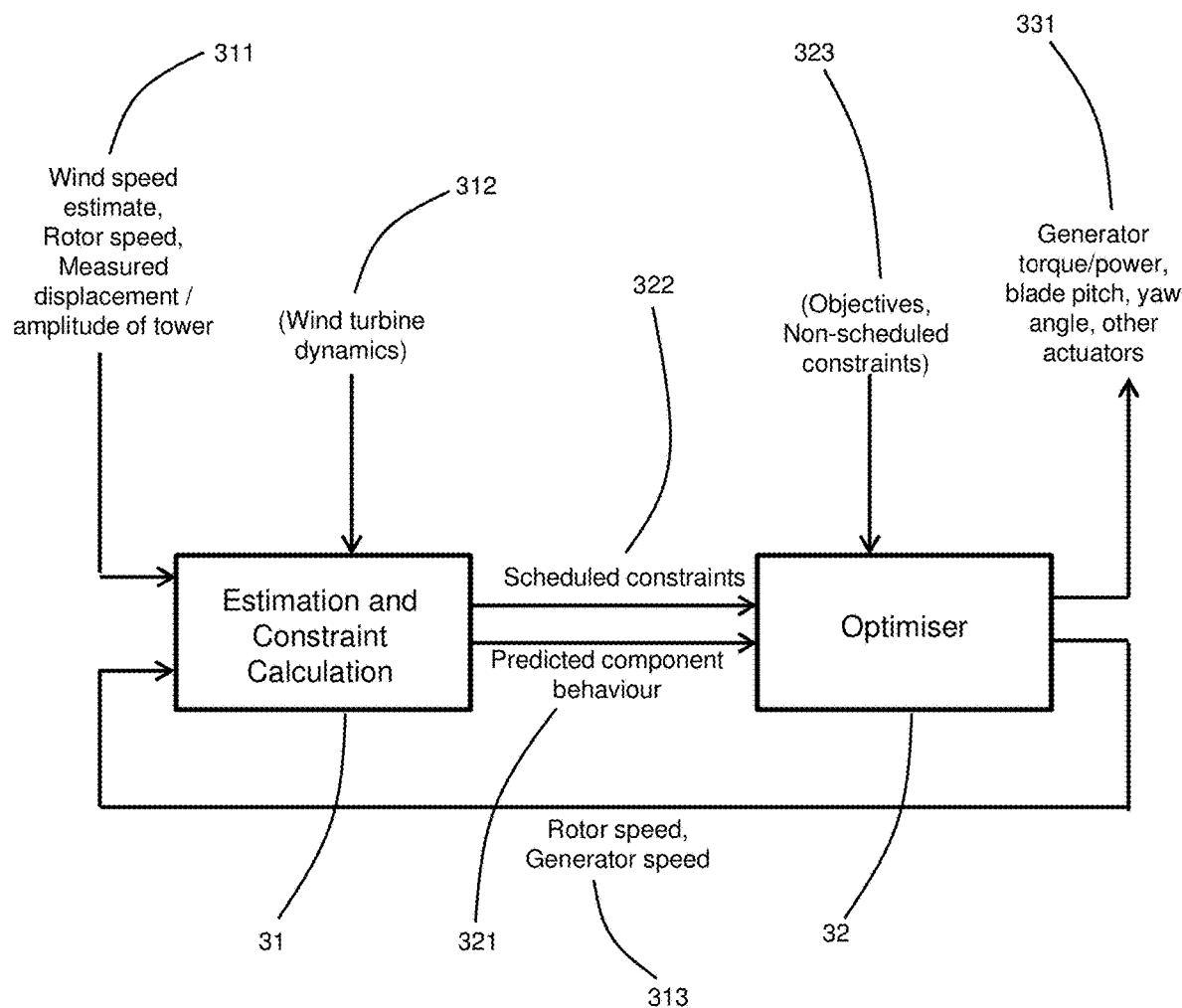
FIG. 3 shows component parts of the controller of FIG. 2, in particular an estimator unit and a model predictive control unit according to an example of the invention.

A specific example implementing this approach in the controller 26 is shown schematically in FIG. 3. Two functional elements are shown—an estimation and constraint calculation unit 31 and an optimisation or model predictive control (MPC) unit 32. Both of these units may be provided by suitable software running on any suitable computing substrate using conventional or customer processors and memory. The estimator unit 31 and the optimisation unit 32 may use a common computing substrate (for example, they may run on the same server or same control node) or separate substrates, or one or both may themselves be distributed between multiple computing devices.

In examples of the invention the estimation and constraint calculation unit 31 receives as inputs 311 measurements of the rotor speed and of the displacement of the tower 12, and an estimate of the wind speed in the vicinity of the wind turbine 10. Alternatively, an estimate of the wind speed may be made in the estimator unit 31. An estimate of tower displacement based on the output of a tower-top accelerometer may be received as an alternative, or in addition, to the measured displacement. Models for components or systems of the wind turbine 10—e.g. the wind turbine tower 12—and dynamics of the wind turbine 10, in particular parameters for use in these models, are also received as inputs 312 to the estimator and constraint calculation unit 31. Furthermore, a rotor speed and/or a generator speed derived as outputs from the optimisation unit 32 each as a predicted trajectory over the prediction horizon are fed back as inputs 313 to the estimator unit 31.

The estimator unit 31 defines a wind turbine model based on the received dynamics of one or more components and outputs predicted behaviour of the components over the prediction horizon, which is received as an input 321 to the optimisation unit 32. In addition, one or more scheduled constraints are output by the estimation and constraint calculation unit received as an input 322 to the optimisation unit 32. This will be described in greater detail below. The objectives on which the MPC or optimisation algorithm is to be applied to the wind turbine model—i.e. a cost function—is received as an input 323 to the optimisation unit 32, together with any non-scheduled (constant) constraints.

The optimisation unit 32 runs a model-based control algorithm—in this example a model predictive control algorithm—based on the received inputs 321, 322, 323 and provides one or more control outputs for controlling operation of the wind turbine 10. In particular, in examples of the invention the optimisation unit 32 provides outputs 331 to actuator systems—such as the actuator system 24—to control speed or torque in a generator of the wind turbine and/or to control pitch of blades of the wind turbine 10 (which may be collective or individual blade pitch control). As mentioned above, a result of the optimisation performed by the optimisation unit 32 is fed back to the estimator unit 31. This may include, for instance, the predicted generator speed and/or predicted rotor speed.

The constraints in the optimisation problem are constraints associated with operation of the wind turbine 10. These can include constraints on the behaviour of components of the wind turbine, e.g. a maximum level of deflection of the tower 12, a maximum speed of the generator, etc. In addition, or alternatively, the constraints can include constraints on the operational performance of the wind turbine, e.g. a maximum noise level generated by the wind turbine 10, a minimum/maximum power production level of the wind turbine 10, etc.

In prior art systems, an MPC controller may optimise control of a wind turbine subject to prescribed (scalar) constraints that are independent of current operation of the wind turbine or the conditions in which the turbine is operation. That is, in prior art systems, an optimisation problem that is solved at each time step of the MPC controller is solved subject to the same constraints at each time step irrespective of operation of the wind turbine or the conditions in which it operates.

Examples of the present invention describe the calculation and use of scheduled constraints in the optimisation problem. That is, the constraints are scheduled such that they may vary between successive solves of the optimisation problem at different time steps of an MPC controller. In particular, at least some of the constraints in the optimisation problem are determined in dependence on at least one operational parameter of the wind turbine 10, that is, a parameter associated with operation of the wind turbine 10 and which may change during operation of the wind turbine 10. An example of such an operation parameter is the operating point of the wind turbine. In particular, the operating point can include a wind condition in the vicinity of the wind turbine 10. Specifically, the wind condition could be a wind speed in the vicinity of the wind turbine. The wind condition could alternatively, or in addition, be turbulence in the vicinity of the wind turbine 10 or a (horizontal and/or vertical) wake in the vicinity of the wind turbine 10. Another example of such an operation parameter used to determine one or more scheduled constraints is a control setting of the wind turbine 10, e.g. a collective pitch position pitch setting of blades of the wind turbine 10. Examples of the determination and use of scheduled constraints are now described in more detail.

Figure 4:
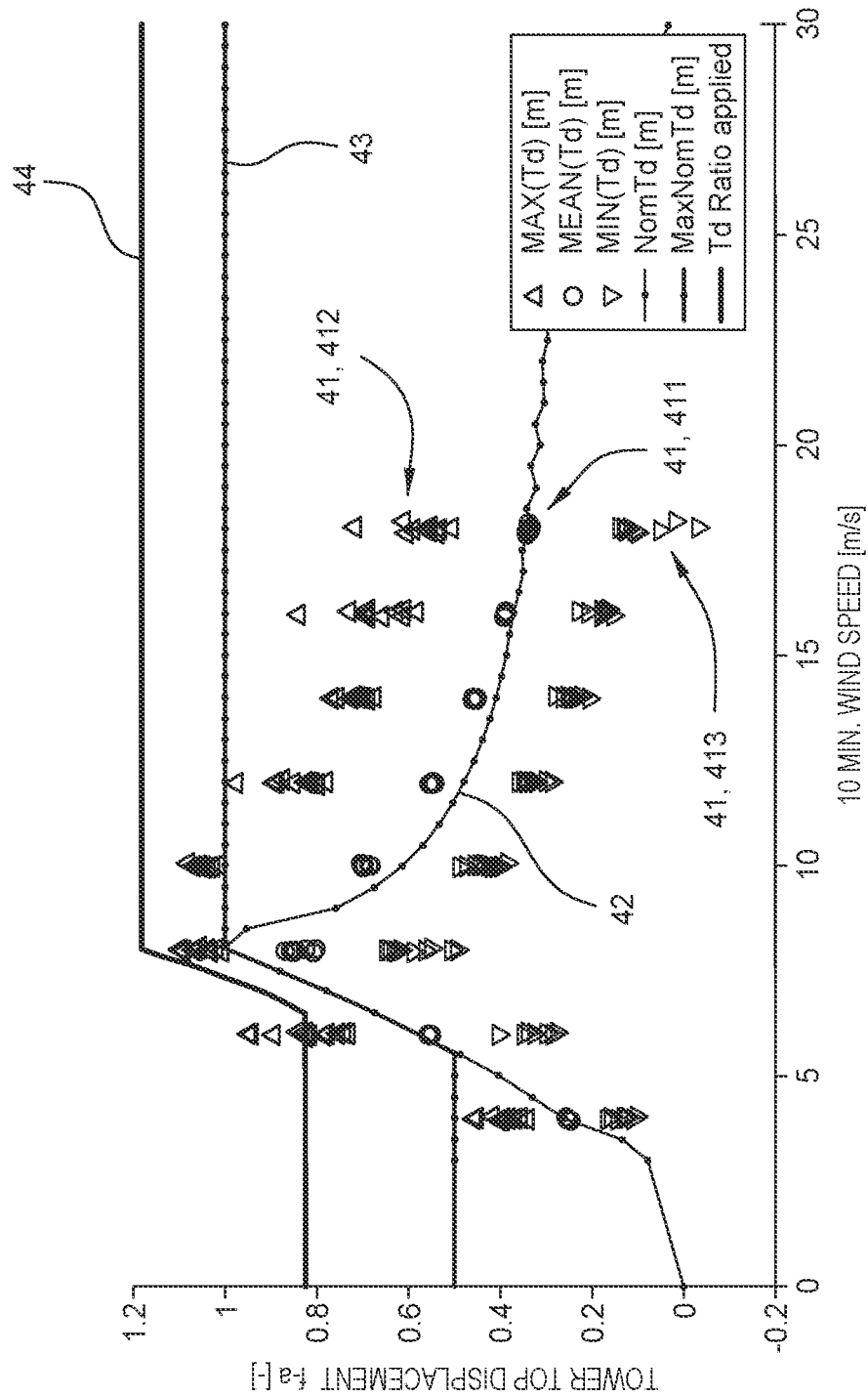
FIG. 4 illustrates an expected deflection of a tower of the wind turbine of FIG. 1 for different wind speeds, and a constraint on the expected deflection to be used by the controller of FIG. 2.

FIG. 4 is an illustrative plot of the amount that the wind turbine tower 12 may be expected to deflect from a neutral or upright position for different wind speeds that the wind turbine 10 may be exposed to. That is, FIG. 4 shows the expected amplitude of oscillations of the tower 12 during operation of the wind turbine 10 for different operating points—i.e. different wind speeds—of the wind turbine 10. The expected deflection of the wind turbine tower 12 is determined using a further model describing dynamics of the wind turbine 10. In particular, the further wind turbine model may be a model having a relatively high number of degrees of freedom to provide accurate estimates, which may also be used for calculations or estimates of loads experienced by the wind turbine 10. This further model may be in contrast to the wind turbine model used in the MPC controller 26, which may be a more simplified model, e.g. a linear model.

The data points 41 are expected values of the tower top displacement for different wind speeds derived using the further wind turbine model. In particular, the data points 411 in the shape of circles indicate mean values of the expected tower top displacement, the data points 412 in the shape of upward-pointing triangles indicate maximum values of the expected tower top displacement, and the data points 413 in the shape of downward-pointing triangles indicate minimum values of the expected tower top displacement. There are a number of data points for each of the mean, maximum and minimum at each given wind speed corresponding to different operation of the wind turbine 10.

A nominal expected tower displacement 42 is extrapolated using the data points 41 using any suitable known method. This is used to derive a maximum nominal expected tower displacement 43 across different values of wind speed. A constraint 44 on the maximum tower displacement for use in the optimisation problem solved in the optimisation unit 32 is then derived by scaling the maximum nominal expected tower displacement 43 for different wind speeds. In particular, it is seen that the constraint is not constant, but instead its value is dependent on the wind speed in the vicinity of the wind turbine 10. Specifically, in this example the maximum tower displacement constraint 44 is constant for wind speeds up to approximately 6.5 m/s, increases monotonically for wind speeds from approximately 6.5 m/s to approximately 8 m/s, and then constant for wind speeds greater than approximately 8 m/s (at a value greater than the value for wind speeds up to approximately 6.5 m/s). Referring back to FIG. 3, the estimation and constraint calculation unit 31 uses a measurement and/or estimate of wind speed to determine a constraint on the maximum tower displacement to be used in the next solve of the optimisation problem and outputs this determined behavioural constraint 322 to be input to the optimiser 32.

Figure 5:
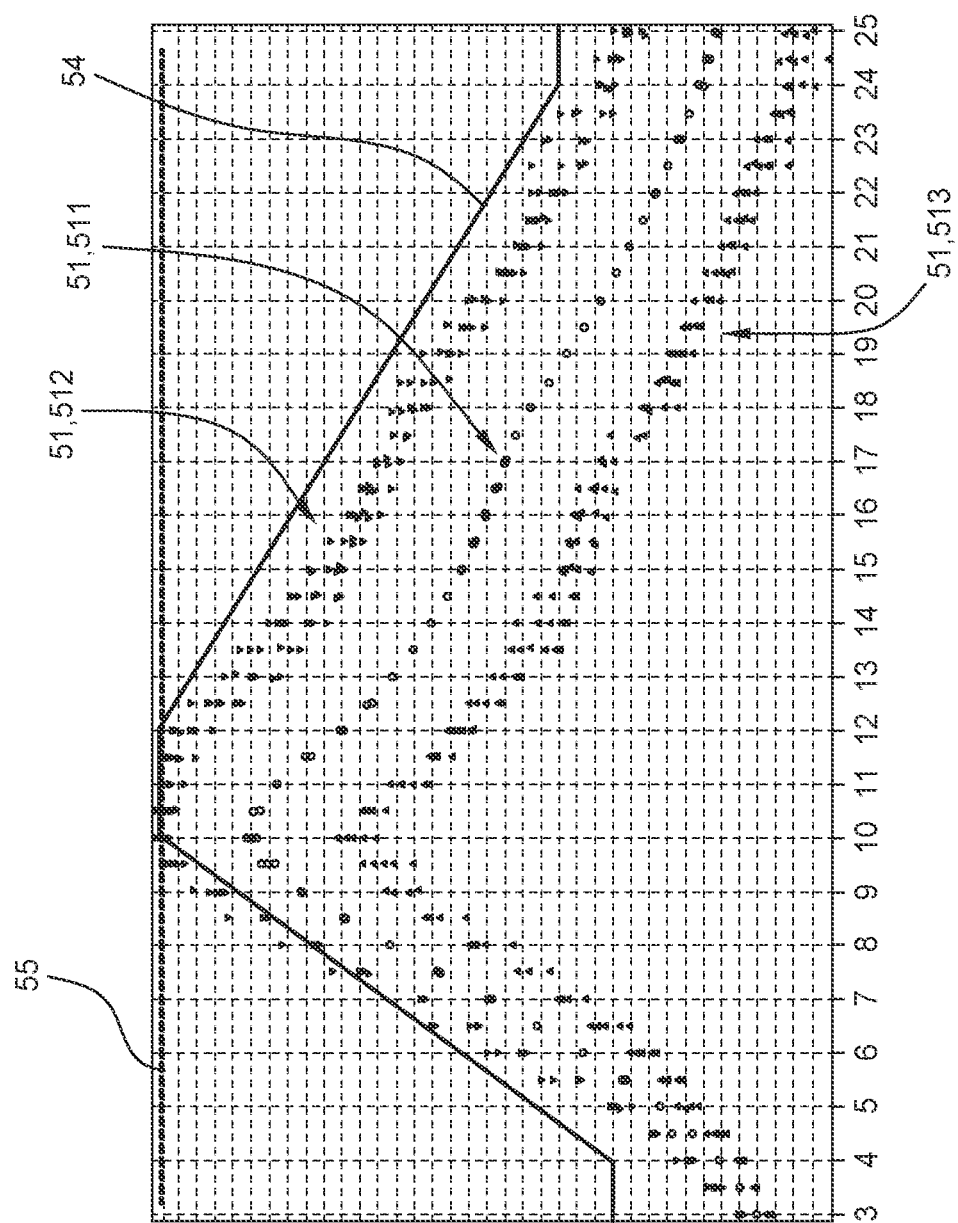
FIG. 5 illustrates an expected deflection of a tower of the wind turbine of FIG. 1 for different wind speeds, and a constraint on the expected deflection to be used by the controller of FIG. 2, in an example different from FIG. 4.

FIG. 5 is an illustrative plot of expected tower top displacement against wind speed in an example different from that illustrated in FIG. 4. Similarly to FIG. 4, FIG. 5 illustrates data points 51 of expected mean 511, maximum 512 and minimum 513 values of tower top displacement derived using a wind turbine model, for instance a high-fidelity model including a number of degrees of freedom. The dotted line 55 illustrates a constant maximum tower top deflection or displacement constraint that may be used as part of an optimisation problem in a prior art system. In contrast, the line or curve 54 illustrates a (non-constant, scheduled) maximum tower top deflection constraint that may be used in the optimisation unit 32 in an example of the present invention. In particular, the maximum tower top deflection constraint 54 is determined based on wind speed, e.g. the expected values are scaled, and/or an operating margin is added to the expected values, to obtain the constraint 54.

FIG. 5 illustrates how the scheduled maximum tower top constraint 54 can be used to improve the reaction of the controller 26 in fast-changing operating conditions, e.g.

when the wind turbine is exposed to a gust of wind, in particular if a significant change in the wind speed occurs more quickly than a frequency that the optimisation problem is solved. For instance, if the wind speed rapidly changes from approximately 6 m/s to approximately 11 m/s then the expected maximum displacement of the tower 12 rapidly increases, thereby increasing the momentum in the tower 12 and making it more likely that a constant constraint 52 will be exceeded. By instead applying the scheduled constraint 54 in the controller, the constraint on the maximum tower top displacement becomes active at a lower wind speed in the controller 26 so as to guard against a relatively fast build-up of momentum in the tower 12.

Figure 6:
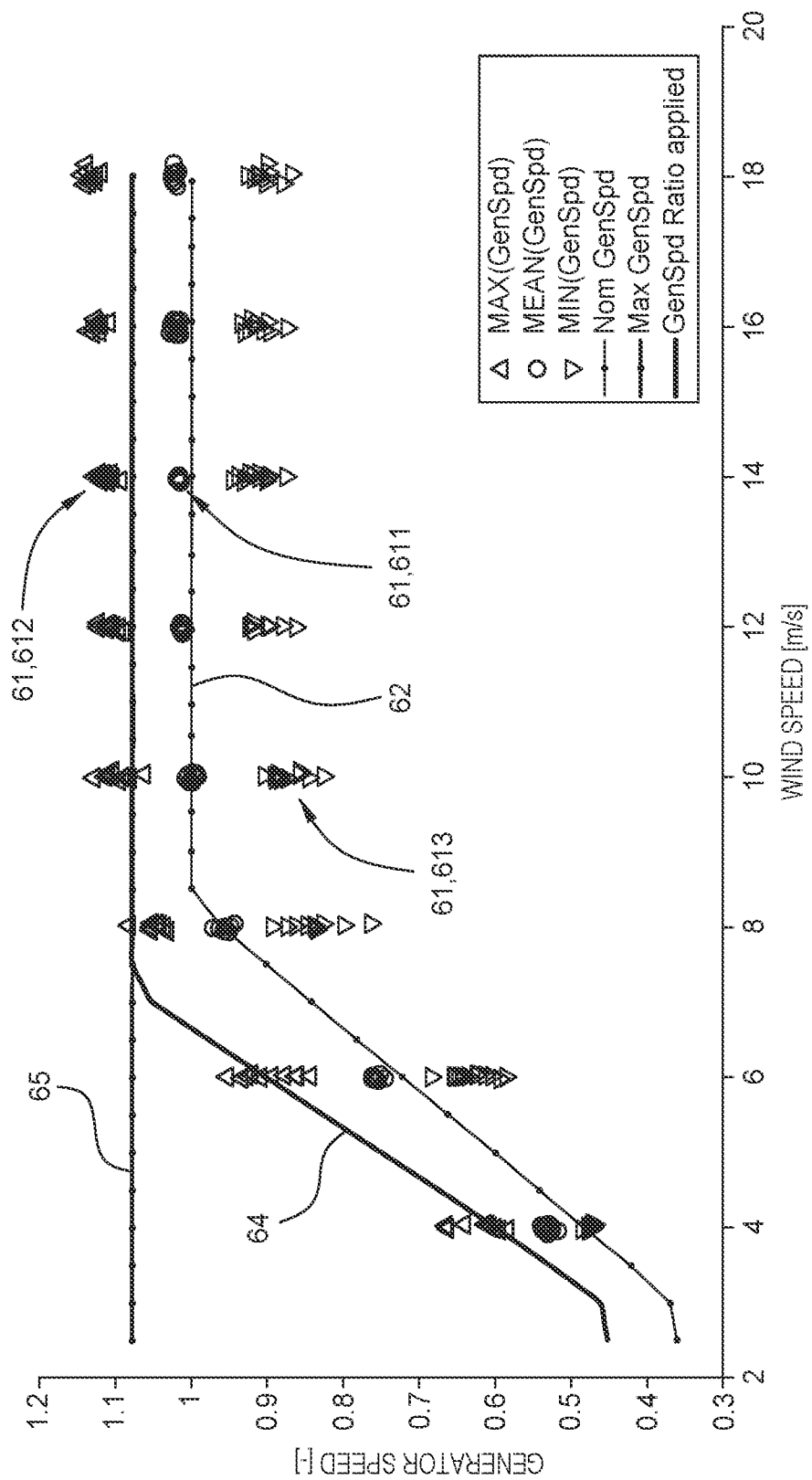
FIG. 6 illustrates an expected speed of a generator of the wind turbine of FIG. 1 for different wind speeds, and a constraint on the expected generator speed to be used by the controller of FIG. 2.

FIG. 6 is an illustrative plot of an example of a different component that may be controlled according to a scheduled (rather than a fixed) constraint. In particular, FIG. 6 is an illustrative plot of the speed that the wind turbine generator may be expected to rotate at for different wind speeds that the wind turbine 10 may be exposed to. Similarly to the example illustrated in FIG. 4, the expected generator speed is determined using a high-fidelity model describing dynamics of the wind turbine 10. The data points 61 are expected values of the wind turbine generator speed for different wind speeds derived using the further wind turbine model. The data points 611 in the shape of circles indicate mean values of the expected generator speed, the data points 612 in the shape of upward-pointing triangles indicate maximum values of the expected generator speed, and the data points 613 in the shape of downward-pointing triangles indicate minimum values of the expected generator speed.

A nominal expected generator speed 62 is extrapolated using the data points 61 using any suitable known method. A constraint 64 on the maximum generator speed for use in the optimisation problem solved in the optimisation unit 32 is then derived by scaling the nominal expected generator speed 62 for different wind speeds. In this example, the maximum generator speed constraint 64 increases monotonically for wind speeds up to approximately 7.5 m/s, and is a constant value for wind speeds greater than approximately 7.5 m/s. For contrast, FIG. 6 also shows a dotted line 65 illustrating a constant maximum generator speed constraint that may be used as part of an optimisation problem in a prior art system.

Figure 7:
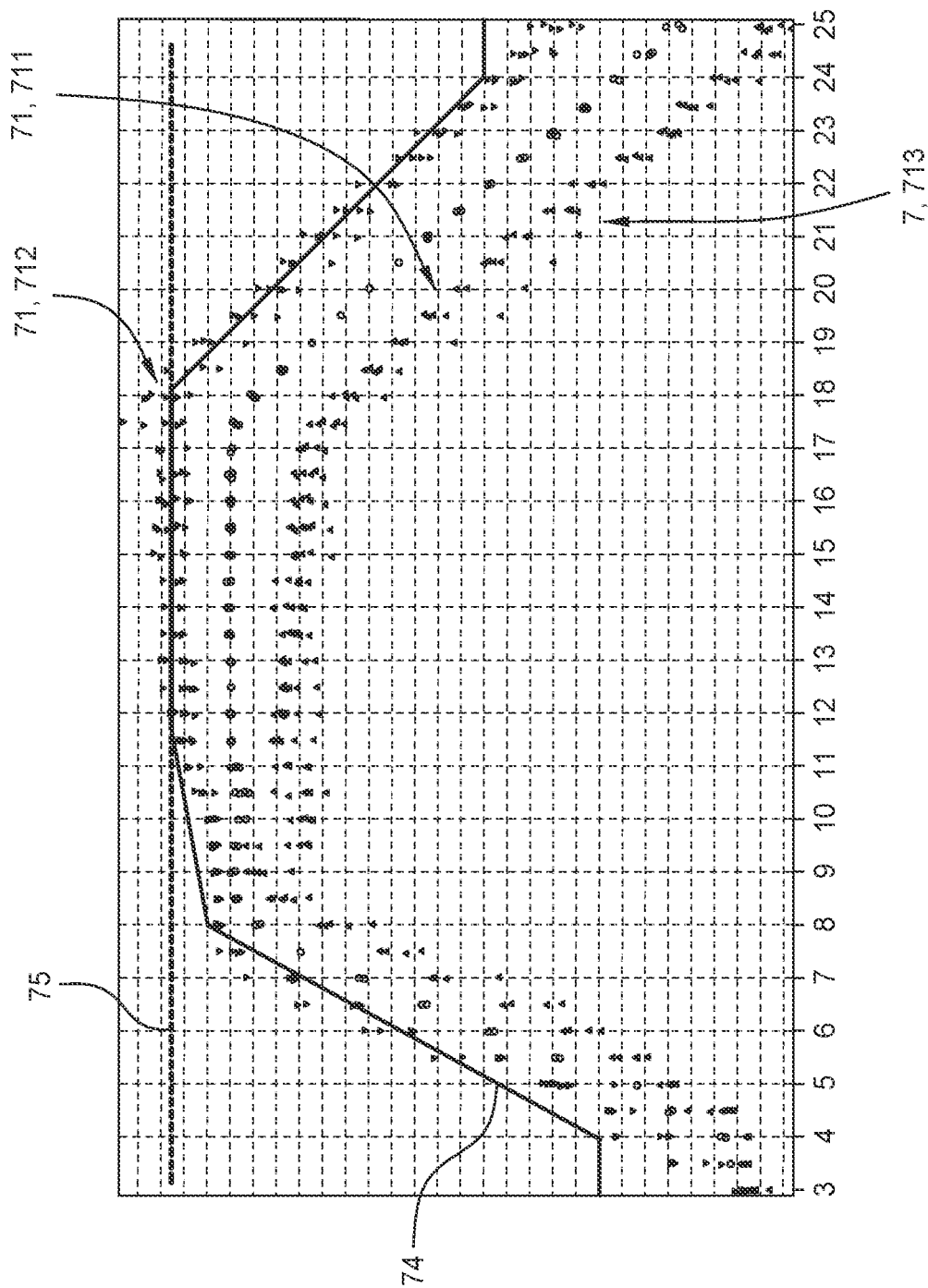
FIG. 7 illustrates an expected speed of a generator of the wind turbine of FIG. 1 for different wind speeds, and a constraint on the expected generator speed to be used by the controller of FIG. 2, in an example different from FIG. 7; and, FIG. 8 summarises the method steps executed by the controller of FIG. 2 according to an example of the invention.

FIG. 7 is an illustrative plot of expected generator speed against wind speed in an example different from that illustrated in FIG. 6. Similarly to FIG. 6, FIG. 7 illustrates data points 71 of expected mean 711, maximum 712 and minimum 713 values of generator speed derived using a wind turbine model having a number of degrees of freedom greater than the wind turbine model of the MPC controller 26. The dotted line 75 illustrates a constant maximum wind turbine generator speed constraint that may be used as part of an optimisation problem in a prior art system. In contrast, the line or curve 74 illustrates a scheduled maximum generator speed constraint that may be used in the optimisation unit 32 in an example of the present invention which, in particular, is determined based on wind speed. In this example, it is seen that rotor or generator speed is reduced during 'high-speed' operation.

In the examples illustrated in FIGS. 4 to 7, an upcoming rapid change in operating point, e.g. a wind gust, can be 'foreseen' in the prediction horizon of the estimator 31. This allows an appropriate value of the relevant constraint 44, 54, 64, 74 to be applied in the next solve of the optimisation problem in the optimiser 32 so as to limit rapid behavioural changes in the wind turbine, for instance in the tower 12 or the rotor.

It will be understood that the scheduled constraints can be derived in any suitable manner based on the relevant operational parameter, e.g. wind speed. For instance, the scheduled constraints may be determined via a look-up table stored in memory based on current values of the operational parameter. Alternatively, the scheduled constraints may be any suitable function of the operational parameter. In one example, the invention may be implemented as scaling constraints with an operational parameter, e.g. wind speed, at partial load, and then setting the constraint to be constant at full load.

Figure 8:
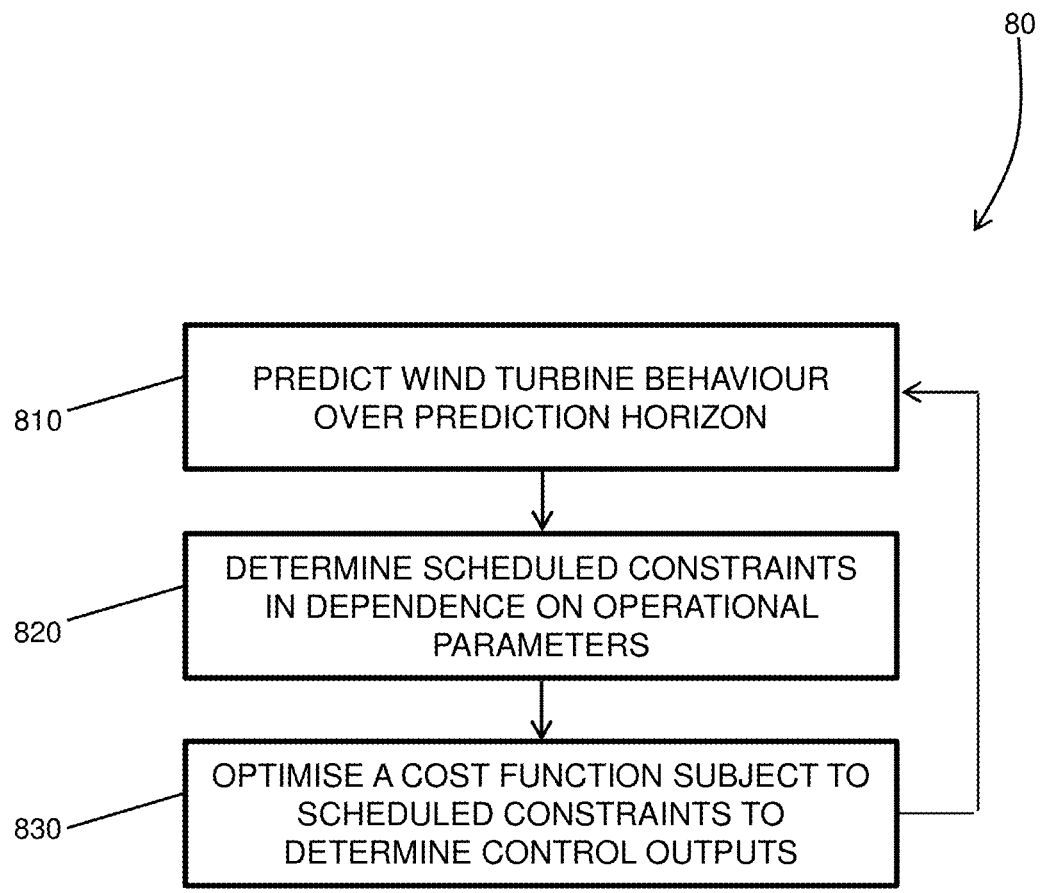

FIG. 8 summarises the steps of a method 80 performed by the controller 26 to control operation of the wind turbine 10. A wind turbine model, e.g. a linear model, describing dynamics of components of the wind turbine 10—e.g. the tower 12, rotor 20—is defined. The model may include dynamics such as tower vibrations, tilt and/or yaw loading, and tower clearance control, as well as generated power output of the turbine 10. At step 810, the controller 26 uses the defined wind turbine model to predict trajectories of one or more variables of the model over a prediction horizon based on received input values 311, 313 for each of a finite number of time steps from a current time step. The input values can include a wind speed estimate, rotor speed measurement and measured displacement of the tower top, and also predicted rotor speed and/or generator speed 313 from a previous solve of the optimisation problem.

At step 820, the controller 26 determines one or more behavioural constraint associated with operation of the wind turbine 10. In particular, the scheduled behavioural constraints are determined in dependence on at least one operational parameter of the wind turbine 10. Specifically, the scheduled constraints are determined at the current time step using a current and predicted state of the wind turbine 10 and its operation. The operational parameters on which the constraints are determined can therefore include an operating point of the wind turbine 10, which typically includes a wind speed in the vicinity of the wind turbine 10, but can additionally include other wind conditions such as wind turbulence or a wake generated by the turbine. The operational parameters on which the constraints are determined can also include output variables associated with performance of the wind turbine 10, such as a level of noise emissions produced by the wind turbine and a level of power produced by the wind turbine. Such operational parameters need to be measured, estimated and/or predicted so that the constraints may be determined and updated at each time step of the controller 26 or, alternatively, updated at prescribed intervals longer than the time step of the controller 26, if preferred. In particular, values (or otherwise) of the scheduled constraints to be used in the next solve of the optimisation problem are determined based on the result of the optimisation at the previous time step, e.g. predicted values of the operational parameters such as wind speed. Some operational parameters envisaged here may be prone to fluctuations, and so a low-pass filter may be applied to an operational parameter, e.g. wind speed, prior to determining a scheduled constraint based on the operational parameter so as to guard against instability in the controller 26. The predicted component behaviour and determined scheduled constraints from the current time step are then output from the estimator unit 31 and input to the optimiser unit 32.

At step 830, the optimisation problem is solved in the optimisation unit 32 using the wind turbine model and subject to the objectives and constraints, predicted or otherwise. The set of constraints used may include constant (non-scheduled) constraints in addition to the scheduled constraints determined by the estimator unit 31. In particular, the predicted wind turbine behaviour is used in a cost function, which is then optimised subject to the determined scheduled (and possibly other) constraints, to determine at least one control output 331 to control operation of the wind turbine 10. Specifically, the scheduled constraints are implemented such that the control outputs act to ensure smooth, predictable or non-oscillatory behaviour of the turbine, particularly during rapid changes in operating conditions. The optimisation problem is solved according to an MPC algorithm to determine the optimal trajectories for each of the system variables, and control outputs over the prediction horizon for controlling the wind turbine to operate according to the optimal trajectories are determined. Typically, in an MPC approach only the control outputs corresponding to the first time step along the prediction horizon are then implemented by the controller 26. Steps 810, 820 and 830 are then repeated to determine the control outputs to be implemented at the next time step.

Many modifications may be made to the above-described examples without departing from the scope of the present invention as defined in the accompanying claims.

In the above-described examples, constraints associated with deflection of a wind turbine tower and speed of a wind turbine generator is described. It will be understood, however, that in different examples constraints associated with different wind turbine components may be determined and applied. For instance, a scheduled constraint for maximum loading in a flapwise direction of the wind turbine blades may be determined and applied in the optimisation problem.

Examples and embodiments of the invention provide for inclusion of constraints in an MPC controller that are variable between time steps of the controller, i.e. variable for different solves of the optimisation problem. In particular, such scheduled constraints for use in the next optimisation are determined at the current time step based on a current state of the wind turbine and its operation, in particular based on operational parameters of the turbine such as wind speed. The present invention may therefore be regarded as the inclusion of constraint scheduling into an MPC controller for wind turbine control, applied to any suitable constraints in the optimisation, hard or otherwise.

Examples and embodiments of the invention are advantageous in that they provide improved wind turbine control, particularly when the wind turbine is exposed to rapidly changing conditions such as a wind gust, with or without a change in wind direction. In particular, the invention can advantageously provide improved regulation of rotor speed, it can prevent shutdowns of the wind turbine, and extreme loading on wind turbine components—such as the tower—can be mitigated. In turn, this can result in reduced wear of wind turbine components. Examples of the invention are particularly advantageous in cases where operational parameters rapidly change when the wind turbine is operating away from a relevant (scalar) constraint. For instance, examples of the present invention provide for a controller having an improved reaction to wind gusts in cases where the gusts start from an operating point—e.g. wind speed—different from a wind speed in which a scalar constraint is active, e.g. a maximum deflection of a wind turbine tower.

The invention claimed is:

1. A method for controlling a wind turbine, the method comprising:
predicting at least one of a deflection of a wind turbine tower, tower vibrations, a nacelle yaw, or tower clearance control of one or more wind turbine components over a prediction horizon using a wind turbine model;
determining at least one behavioural constraint associated with operation of the wind turbine, wherein the at least one behavioural constraint is determined in dependence on at least one operational parameter of the wind turbine; and
using the at least one of the deflection of the wind turbine tower, the tower vibrations, the nacelle yaw, or the tower clearance control of the one or more wind turbine components in a cost function, and optimising the cost function subject to the at least one determined behavioural constraint to determine at least one control output for controlling operation of the wind turbine.

2. The method of claim 1, wherein predicting the at least one of the deflection of the wind turbine tower, the tower vibrations, the nacelle yaw, or the tower clearance control of the one or more wind turbine components comprises predicting the at least one operational parameter over the prediction horizon.

3. The method of claim 2, wherein the at least one behavioural constraint is determined in dependence on the at least one predicted operational parameter of the wind turbine.

4. The method of claim 1, wherein the at least one operational parameter comprises a wind condition in a vicinity of the wind turbine.

5. The method of claim 1, wherein the at least one operational parameter comprises a control setting of the wind turbine.

6. The method of claim 1, wherein the at least one behavioural constraint is determined based on expected dynamics of the one or more wind turbine components.

7. The method of claim 6, wherein the expected dynamics of each of the one or more wind turbine components comprises values describing the dynamics for different operational parameters of the wind turbine.

8. The method of claim 6, wherein the at least one behavioural constraint is a threshold value determined by:
applying a scaling factor to one or more operational parameters of the wind turbine; and
adding or subtracting an operational margin to the one or more operational parameters of the wind turbine.

9. The method of claim 1, the method comprising determining the at least one behavioural constraint at each time step of the method.

10. The method of claim 1, the method comprising applying a low-pass filter to the operational parameter prior to determining the at least one behavioural constraint.

11. The method of claim 1, wherein the at least one behavioural constraint associated with operation of the wind turbine comprises at least one behavioural constraint for one or more of the wind turbine components.

12. The method of claim 1, wherein:
the one or more wind turbine components comprises a tower of the wind turbine, and the behavioural constraint for the tower is a maximum deflection of the tower; and
the one or more wind turbine components comprises a generator of the wind turbine, and the behavioural constraint for the generator is a maximum speed of the generator.

13. The method of claim 1, wherein the at least one behavioural constraint associated with operation of the wind turbine comprises at least one behavioural constraint of operational performance of the wind turbine.

14. A controller for controlling a wind turbine, the controller being configured to:
predict at least one of a deflection of a wind turbine tower, tower vibrations, a nacelle yaw, or tower clearance control of one or more wind turbine components over a prediction horizon using a wind turbine model;
determine a behavioural constraint based on at least one operational parameter of the wind turbine, wherein the behavioural constraint comprises at least one of: a speed of a generator, a tower deflection, a noise level, or a power production; and
use the at least one of the deflection of the wind turbine tower, the tower vibrations, the nacelle yaw, or the tower clearance control of the one or more wind turbine components in a cost function, and optimise the cost function subject to the at least one determined behavioural constraint to determine at least one control output for controlling operation of the wind turbine.

15. The controller of claim 14, wherein predicting at least one of the deflection of the wind turbine tower, the tower vibrations, the nacelle yaw, or the tower clearance control of the one or more wind turbine components comprises predicting the at least one operational parameter over the prediction horizon.

16. The controller of claim 15, wherein the at least one behavioural constraint is determined in dependence on the at least one predicted operational parameter of the wind turbine.

17. The controller of claim 14, wherein the at least one operational parameter comprises a wind condition in a vicinity of the wind turbine.

18. A wind turbine, comprising:
a tower;
a nacelle disposed on the tower;
a rotor extending from the nacelle;
a plurality of blades disposed on a distal end of the rotor; and
a controller configured to perform an operation, comprising:
predicting at least one of a deflection of a wind turbine tower, tower vibrations, a nacelle yaw, or tower clearance control of one or more wind turbine components over a prediction horizon using a wind turbine model;
determining a behavioural constraint based on at least one operational parameter of the wind turbine, wherein the behavioural constraint comprises at least one of: a speed of a generator, a tower deflection, a noise level, or a power production; and
using the at least one of the deflection of the wind turbine tower, the tower vibrations, the nacelle yaw, or the tower clearance control of the one or more wind turbine components in a cost function, and optimise the cost function subject to the at least one determined behavioural constraint to determine at least one control output for controlling operation of the wind turbine.

19. The wind turbine of claim 18, wherein predicting at least one of the deflection of the wind turbine tower, the tower vibrations, the nacelle yaw, or the tower clearance control of the one or more wind turbine components comprises predicting the at least one operational parameter over the prediction horizon.

20. The wind turbine of claim 19, wherein the at least one behavioural constraint is determined in dependence on the at least one predicted operational parameter of the wind turbine.

* * * * *